Sept. 14, 1965  A. M. MARKS  3,205,775
LIGHT POLARIZING STRUCTURES INCORPORATING
UNIAXIAL AND LINEAR POLARIZERS
Filed June 19, 1961

INVENTOR.
ALVIN M. MARKS
BY Albert F. Kronman
ATTORNEY

United States Patent Office
3,205,775
Patented Sept. 14, 1965

3,205,775
LIGHT POLARIZING STRUCTURES INCORPORATING UNIAXIAL AND LINEAR POLARIZERS
Alvin M. Marks, 149—61 Powells Cove Blvd., Whitestone 57, N.Y.
Filed June 19, 1961, Ser. No. 117,956
2 Claims. (Cl. 88—65)

This invention relates to light polarizing sturctures and particularly to light polarizers capable of transmitting only that light which comes from a selected narrow angular range, about the normal to the sheet.

Previously known light polarizing devices generally fall into the classification of linear polarizers and multilayer polarizers. The linear polarizers consist of a sheet of a substantially continuous crystalline film of a transparent high polymeric material such as a polyvinyl butyrate, polyvinyl alcohol, and the like containing a polarizing element. Other linear polarizers are made of sheets of a plastic medium within which there is incorporated a large number of aligned light polarizing crystals disposed parallel to each other and in the plane of the plastic sheet. Multi-layer polarizers consist of a large number of layers of transparent material in which alternate layers are of sharply different indices of refraction. Multi-layer polarizers have the unique property of producing radially polarized light; whereas, the plane of polarization of light transmitted by linear polarizers is parallel to its polarizing axis.

Where it is desired to control light in such a manner that only light coming from a selected narrow angular range about the normal to the sheet will be transmitted, neither the linear polarizer nor the multi-layer polarizer may be used alone to accomplish this result. In such applications an entirely novel type of polarizer such as is hereinafter described, is required.

Accordingly, it is an object of the present invention to provide a light polarizing structure which will polarize light incident thereon at an angle to the normal.

Another object of the present invention is to provide a light polarizer which will transmit a beam of light polarized in the same plane as the incident light.

A further object of the present invention is to provide a linear polarizer with radial light distribution.

An object of the present invention is to provide a structure which will extinguish all light incident thereon except from a narrow angular range about the normal to the sheet.

A further object of the present invention is to provide an ambient light absorbing filter for television, radar and other displays thus permitting the viewing of such displays with high contrast in the presence of relatively high ambient illumination.

As used in the specification the term "uniaxial polarizer" refers to a structure consisting of a sheet of transparent material containing a plurality of aligned polarizing particles or crystals in parallel orientation with respect to each other and disposed normal to the plane of the transparent sheet.

A feature of the present invention is its use of a uniaxial polarizer for symmetrically controlling the transmittance and polarization of light with reference to the normal to the sheet.

A further feature of the present invention is its use of uniaxial polarizers in combination with one or more linear polarizers to further control the passage of light therethrough.

Another feature of the present invention is the method of aligning light polarizing crystals within a supporting structure to produce a uniaxial polarizer.

The invention consists of the construction, combination and arrangement of parts, as herein illustrated, described and claimed.

In the accompanying drawings, forming a part hereof are illustrated three forms of embodiment of the invention, in which drawings similar reference characters designate corresponding parts, and in which.

Figure 1:
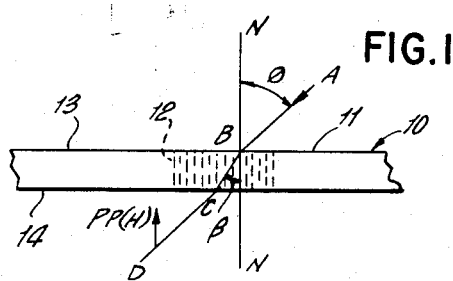
FIGURE 1 is a somewhat diagrammatic fragmentary cross-sectional view of a uniaxial light polarizer made in accordance with the present invention.

Referring to the drawings, and specifically to FIGURE 1, 10 indicates a uniaxial polarizing sheet consisting of a sheet of transparent material 11, having a plurality of light polarizing particles 12 disposed therein. The transparent sheet 11 may consist of any suitable transparent plastic material such as polyvinyl alcohol, polyvinyl butyrate, cellulose acetate, cellulose nitrate, or the like. The polarizing particles 12 may be, for example, crystals of herapathite (iodo-quinine-sulphate) or of homolog (iodo-cinchonidine-sulphate). The polarizing particles 12 are aligned within the sheet 11 so as to lie parallel with adjacent particles and disposed in a direction normal to the surfaces 13, 14, of the sheet 11. This disposition is hereinafter referred to as disposed normal to the plane of the sheet.

As shown in FIGURE 1, a ray of light AB is incident upon the uniaxial polarizer 10 at an angle $\theta$ with the normal NN' and is refracted to make an angle $\beta$ with the normal NN', upon entering the sheet 11. After emerging from the sheet 11 as ray CD, the light is polarized in the plane of incidence (H-vector lies in the plane of incidence), and thus the polarization vector is symmetrical about the normal NN' as an axis of revolution.

Figure 2:
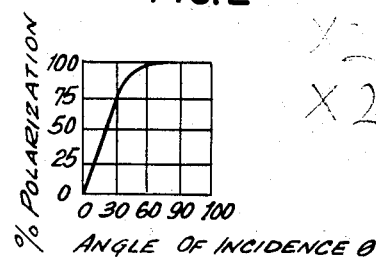
FIGURE 2 is a graph showing the percent of polarization against the angle of incidence of a polarizer made in accordance with FIGURE 1.

The performance of the uniaxial polarizer shown in FIGURE 1 is illustrated by the graph of FIGURE 2. Referring to the graph it will be seen that the polarization of light passing along the normal NN is zero. However, depending upon the thickness of the sheet 11, the percentage of polarization rapidly increases until at an angle of $\theta$ equal to 45°, the percentage of polarization is about 90%.

Figure 3:
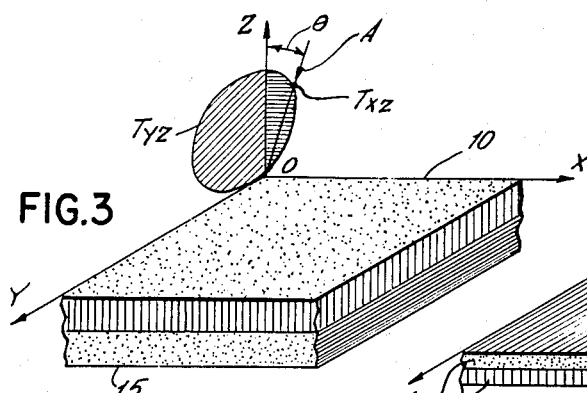
FIGURE 3 is a fragmentary somewhat diagrammatic view of a combined uniaxial and linear polarizing structure made in accordance with the present invention, having asymmetrical angular transmittance characteristics.

One or more uniaxial polarizers hereinabove described, when combined with linear polarizers produce novel structures having unique light controlling properties. In FIGURE 3 there is shown a structure consisting of a uniaxial polarizer 10 to which there is laminated a linear polarizer 15. The linear polarizer 15 may be made in accordance with the teaching of U.S. Patent No. 2,432,113, issued to Alvin M. Marks, et al., or any other commercially available article of this type. In the structure shown in FIGURE 3, the plane of polarization of the linear polarizer 15 is disposed parallel to the Y axis of the device. A light ray AO which makes an angle $\theta$ with the Z axis in the XZ plane, will be polarized in passing through the uniaxial polarizer 10 with the plane of polarization in XZ plane. When the light ray enters the linear polarizer 15, after leaving the uniaxial polarizer 10, polarized rays are absorbed by the linear polarizer if the angle $\theta$ increases from zero, and total absorption by the linear polarizer 15 will be reached as the angle $\theta$ exceeds 45°.

However, if the angle $\theta$ in FIGURE 3 is less than 45° the ray AO will be only partially polarized in passing through the layer of the uniaxial polarizer 10. As a result, a higher percentage transmittance occurs in the structure illustrated in FIGURE 3, where the angle of incidence of the rays AO is less than 45°. When the angle $\theta$ equals 0° and the ray passes along the Z axis the transmittance will be at a maximum since the uniaxial polarizer does not polarize light which is normal to the plane thereof and this light will then only be absorbed to the extent that ordinary light would be in passing through the linear polarizer 15. Thus the peak transmittance of the combination shown in FIGURE 3 is of the order of 40% at an angle of incidence equal to zero. Where rays are directed at the structure shown in FIGURE 3 along the YZ plane they pass through the uniaxial polarizer 10 and emerge from it polarized in the plane of incidence. This plane is now parallel to the polarizing direction of the linear polarizing sheet 15 so that the rays are transmitted over an angle of $$0 < \theta < 90°$$

It will thus be seen that in the YZ plane rays are transmitted through a wide angle, whereas in the XZ plane rays are transmitted readily only when they make a small angle, of between 0° and 30° with the Z axis.

Figure 4:
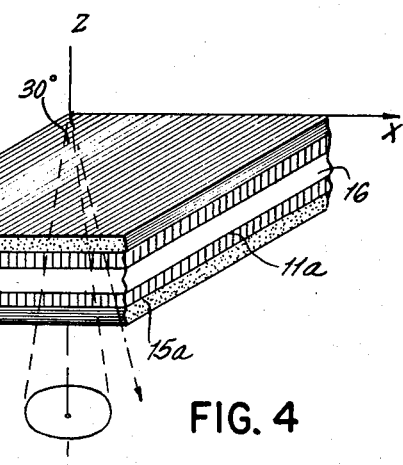
FIGURE 4 is a fragmentary somewhat diagrammatic view of a further form of combined uniaxial and linear polarizing structure made in accordance with the present invention, having symmetrical angular transmittance characteristics.
Figures 5, 6:
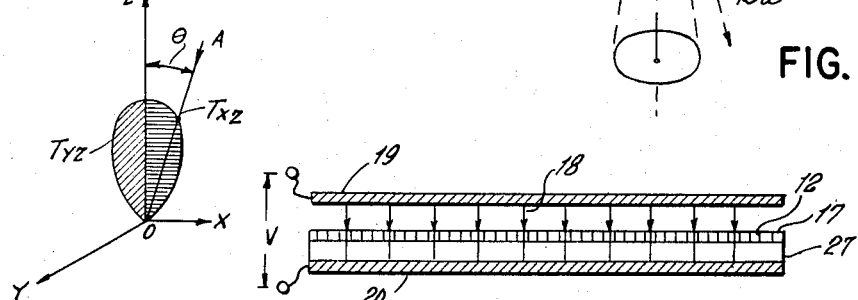
FIGURE 5 is a diagrammatic representation of the symmetrical transmittance measured against the angle of incidence about the Z axis of FIGURE 4.
FIGURE 6 is a somewhat diagrammatic view illustrating the method of manufacturing the polarizers shown in FIGURE 1.

If a panel made in accordance with the structure shown in FIGURE 3 were disposed in front of a television or radar display tube with the polarizing axis of the linear polarizer 15 vertically disposed, it would be possible to observe the screen from a wide horizontal angle. However, those rays which proceed from above, as from the sky, and are incident upon the panel through a wide range of almost vertical angles (in excess of 30°) to the Z axis, will be totally absorbed. A major portion of the ambient light from overhead is thereby totally absorbed by the panel while at the same time there is provided a high visibility through a wide range of angles in a horizontal plane. High contrast on the screen surface is thus maintained.

Where a picture display in the horizontal plane is required the structure shown in FIGURE 4 is preferred. A panel made in accordance with this embodiment permits viewing only within a small conical angle symmetrically placed about the Z axis. In FIGURE 5 there is illustrated the transmittance versus the angle about the Z axis resulting from light incident upon the structure of FIGURE 4. A symmetrical pattern results.

Referring to FIGURE 4 it will be seen that the polarizing member consists of a first linear polarizer 15, beneath which there is a first uniaxial polarizer 11, a second uniaxial polarizer 11a and a second linear polarizer 15a. The linear polarizers 15, 15a, are disposed with their axis of polarization at 90° with respect to each other and respectively parallel to the reversed axis of the assembly. The linear polarizers are thus positioned to extinguish light incident upon the assembly. The uniaxial polarizers 11, 11a, are similar in construction and have their axial direction parallel to the Z axis. In order to permit light to pass along the Z axis of the assembly, there is also provided a half-wave retardation plate 16 between the first uniaxial polarizer and the second uniaxial polarizer in FIGURE 4. The half-wave retardation plate 16 acts to rotate the plane of polarization of the light transmitted therethrough, through 90°, thus permitting light to be transmitted through the crossed polarizers 15, 15a, when it passes along the Z axis of the assembly.

Light rays proceeding through the asembly outside of the 30° cone shown in FIGURE 4 will be totally absorbed.

Uniaxial polarizers such as have been described hereinabove can be manufactured in accordance with the diagrammatic showing of FIGURES 6 and 7.

In FIGURE 6 a layer containing a suspension of dipole particles such as herapathite crystals 12 may be applied as a lacquer coating containing solvent. An electric field indicated by the arrows 18 is applied normal to the surface of the layer 17 and a current of air allowed to pass over the surface of the layer 17 to dry the lacquer coating 17 into a film. The particles are thereby set in place normal to the surface of the layer 17, that is, normal to the plane of the said layer. This film 17 may be applied to a transparent supporting base 21, or directly to another layer such as the linear polarizer 15 or the half-wave retardation plate 16.

Figure 7:
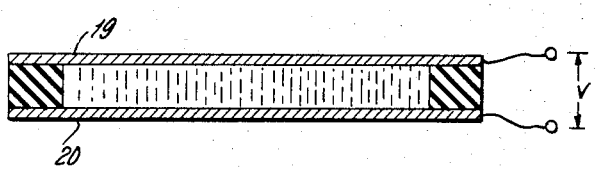
FIGURE 7 is a somewhat diagrammatic view illustrating still another method of manufacturing a uniaxial polarizer.

In the method illustrated in FIGURE 7, a suspension of known needle-like polarizing particles, such as, iodo-quinine-sulfate or iodo-cinchonidine-sulfate, and the like is prepared within a thermosetting transparent monomer. The monomer is thereafter hardened by the application of heat for a suitable period of time while at the same time an electric field is applied across the suspension in the manner illustrated in FIGURES 6 and 7. Plates 19 and 20 which are connected to a suitable source of electrical difference V potential (not shown) may be employed for this purpose. When the monomer is polymerized the dipoles will be permanently set in position and the uniaxial polarizer formed.

Alternatively, a thermosetting material may be used as a suspending medium. The electric field is then applied while the thermosetting material is fluid under elevated temperature. Thereafter, the thermosetting aligned suspension is hardened by cooling, while the electric field is maintained, while the suspension is thus permanently set.

From the foregoing it will be observed that there has been provided light polarizing structures capable of polarizing all the light incident thereon except that which proceeds symmetrically from a narrow cone about the vertical axis or asymmetrically as in a louver. Such structures when used in conjunction with linear polarizers and half-wave retardation plates are capable of a large number of polarizing applications such as a light collimator filter, ambient light filter for radar and television displays, window shades which will absorb overhead rays from the sun but which will permit vision at restricted angles, and the like. The symmetrical structures act as though they were an assembly of molecular tubes while the asymmetric type acts as though they were an assembly of molecular louvers, though in fact these structures are absent and the effect is obtained entirely through the functioning of the optical elements herein described.

Having thus fully described the invention, what is claimed as new and desired to be secured by Letters Patent of the United States, is:

1. A light polarizing structure comprising a sheet of transparent material, a plurality of elongated light polarizing particles disposed therein, said particles being in parallel alignment with respect to each other and disposed in a direction normal to the plane of the sheet and a linear polarizer on one side thereof to provide asymmetrical angular light transmittance characteristics.

2. A light polarizing structure comprising a first linear polarizer, a first uniaxial polarizer, comprising a sheet of transparent material and a plurality of light polarizing elongated particles in said transparent material, said particles being disposed normal to the plane of the transparent sheet, attached to the first linear polarizer, a half-wave retardation plate secured to the first uniaxial polarizer opposite the first linear polarizer, a second uniaxial polarizer attached to the half-wave plate opposite the first uniaxial polarizer and a second linear polarizer laminated to the second uniaxial polarizer opposite the half-wave plate, said first and second linear polarizer being disposed with their axes of polarization to extinguish light incident thereon whereby only light incident thereon about a narrow angular range with respect to the normal to the sheet will be transmitted.

References Cited by the Examiner

UNITED STATES PATENTS

| | | | |
|---|---|---|---|
| 1,918,848 | 7/33 | Land et al. | 88—65 |
| 2,017,705 | 10/35 | Sproxton | 88—65 |
| 2,270,535 | 1/42 | Land et al. | 88—65 |
| 2,420,279 | 5/47 | Young | 88—65 |
| 2,475,921 | 7/49 | Smith | 88—65 |

DAVID H. RUBIN, *Primary Examiner.*

JULIA E. COINER, *Examiner.*